(12) United States Patent
Jamieson et al.

(10) Patent No.: US 8,640,934 B2
(45) Date of Patent: Feb. 4, 2014

(54) ROOF RACK WITH STOWABLE NON-ADJUSTABLE CROSSBARS

(75) Inventors: Desmond P. Jamieson, Toronto (CA); Jeffrey R. Johnson, West Bloomfield, MI (US); Sackda Samatchai, Kitchener (CA); Phil Grella, Toronto (CA)

(73) Assignee: Magna International Inc., Aurora (CA)

( * ) Notice: Subject to any disclaimer, the term of this patent is extended or adjusted under 35 U.S.C. 154(b) by 697 days.

(21) Appl. No.: 12/490,736

(22) Filed: Jun. 24, 2009

(65) Prior Publication Data

US 2009/0321485 A1 Dec. 31, 2009

Related U.S. Application Data

(60) Provisional application No. 61/133,377, filed on Jun. 27, 2008.

(51) Int. Cl.
*B60R 9/045* (2006.01)
*B60R 9/04* (2006.01)

(52) U.S. Cl.
USPC ............ 224/321; 224/322; 224/325; 224/326

(58) Field of Classification Search
USPC ......... 224/309, 314, 315, 321, 322, 325, 326, 224/317, 319, 323, 329, 330
See application file for complete search history.

(56) References Cited

U.S. PATENT DOCUMENTS

| | | | | |
|---|---|---|---|---|
| 3,724,730 A | * | 4/1973 | Olsen et al. | 224/309 |
| 4,299,346 A | * | 11/1981 | Helm | 224/325 |
| 4,673,119 A | * | 6/1987 | Bott | 224/326 |
| 4,768,691 A | * | 9/1988 | Stapleton | 224/321 |
| 4,815,643 A | * | 3/1989 | Heideman | 224/321 |
| 5,016,799 A | * | 5/1991 | Stapleton | 224/326 |
| 5,340,007 A | | 8/1994 | Jeuffray et al. | |
| 5,377,890 A | | 1/1995 | Brunner et al. | |
| 5,395,024 A | * | 3/1995 | Luchtenberg | 224/321 |
| 5,511,709 A | | 4/1996 | Fisch | |
| 5,524,803 A | | 6/1996 | Arvidsson | |
| 5,758,810 A | | 6/1998 | Stapleton | |
| 6,279,802 B1 | * | 8/2001 | Hickman et al. | 224/321 |
| 6,286,739 B1 | | 9/2001 | Stapleton | |
| 6,811,066 B2 | | 11/2004 | Aftanas et al. | |
| 6,959,845 B2 | | 11/2005 | Aftanas et al. | |
| 7,055,897 B2 | | 6/2006 | Ozkok et al. | |
| 7,066,364 B2 | * | 6/2006 | Kmita et al. | 224/321 |
| 7,090,103 B2 | | 8/2006 | Aftanas et al. | |
| 7,422,130 B2 | | 9/2008 | Shaukat | |
| 7,448,523 B2 | * | 11/2008 | Aftanas et al. | 224/321 |
| 8,028,875 B2 | * | 10/2011 | Kmita et al. | 224/309 |

(Continued)

FOREIGN PATENT DOCUMENTS

| | | |
|---|---|---|
| CN | 102529829 A * | 7/2012 |
| DE | 10322448 A1 * | 12/2004 |
| FR | 2794702 A1 * | 12/2000 |

*Primary Examiner* — Justin Larson
*Assistant Examiner* — Todd Anderson
(74) *Attorney, Agent, or Firm* — Warn Partners, P.C.

(57) ABSTRACT

The present invention is a roof rack having stowable, non-adjustable cross-bars. The roof rack also includes a plurality of mounts attached to a vehicle in an arrangement to provide a singular stowed position and a singular deployed position. The present invention also includes at least one cross-bar attached between the stowed position or the deployed position. The cross-bar is completely detached from the plurality of mounts to move the cross-bar from the stowed position to the deployed position.

16 Claims, 2 Drawing Sheets

(56) References Cited

U.S. PATENT DOCUMENTS

| | | | |
|---|---|---|---|
| 8,251,267 B2* | 8/2012 | Aftanas et al. | 224/321 |
| 8,276,794 B2* | 10/2012 | Aftanas | 224/321 |
| 8,485,403 B2* | 7/2013 | Stahl et al. | 224/321 |
| 2005/0199666 A1 | 9/2005 | Aftanas et al. | |
| 2006/0163297 A1* | 7/2006 | Moreau | 224/321 |
| 2010/0264179 A1* | 10/2010 | Johnson et al. | 224/315 |

\* cited by examiner

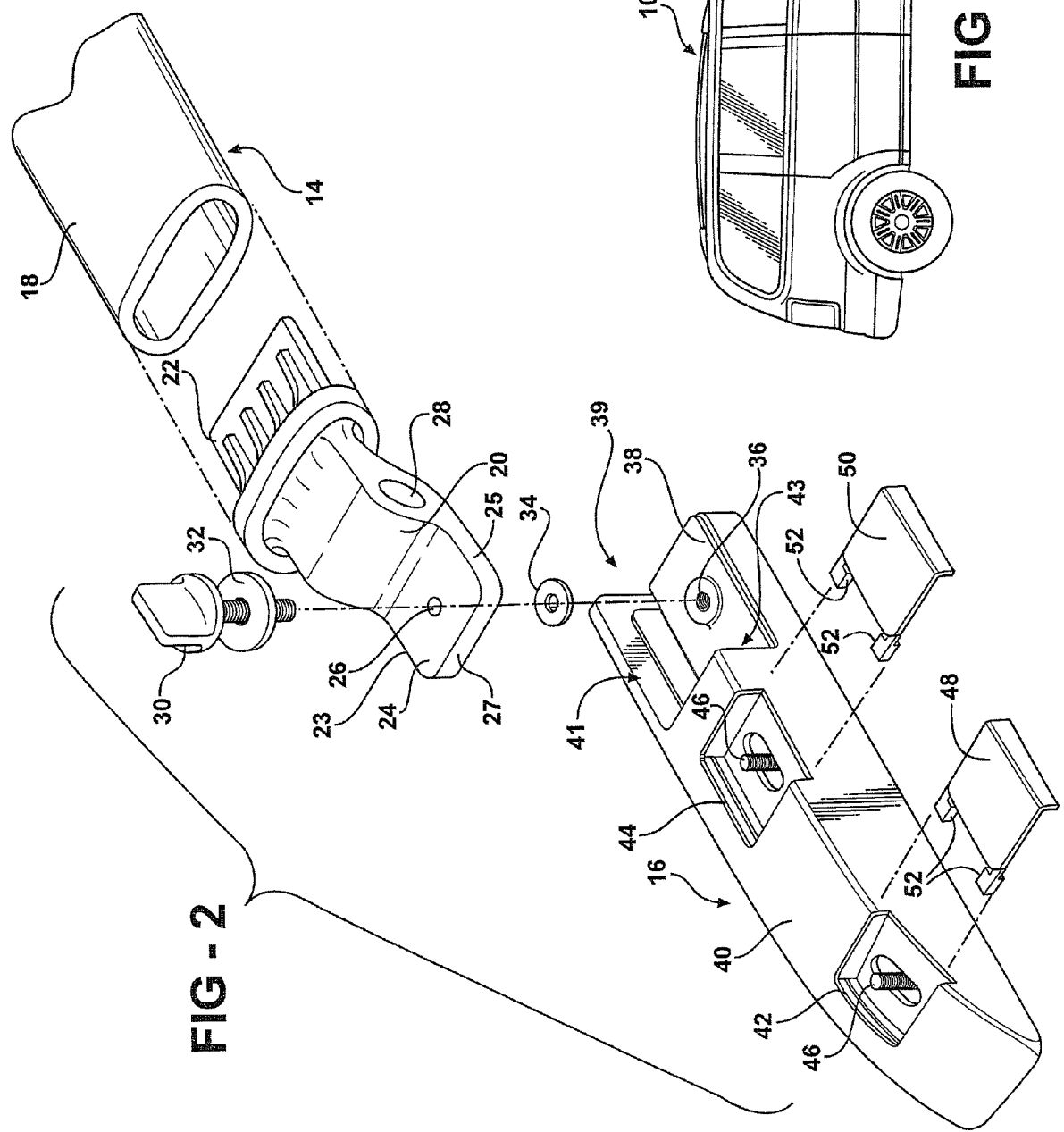

ROOF RACK WITH STOWABLE NON-ADJUSTABLE CROSSBARS

CROSS-REFERENCE TO RELATED APPLICATIONS

This application claims the benefit of U.S. Provisional Application No. 61/133,377, filed Jun. 27, 2008. The disclosure of the above application is incorporated herein by reference.

FIELD OF THE INVENTION

The present invention relates to roof rack used for stowing various items on top of a vehicle.

BACKGROUND OF THE INVENTION

Roof rack assemblies are a common way luggage is stowed on a vehicle during travel. It has become common place to use the roof of a vehicle to stow items which do not fit inside the vehicle. There are many different types of roof racks available which are used on many different types of vehicles, such as mini-vans, sport utility vehicle, cars, and the like. However, since these roof racks typically extend across the roof of the vehicle in a manner perpendicular to the direction of vehicle travel, there is often a substantial amount of wind noise produced by the vehicle while driving down the road. This wind noise is considered undesirable, and several roof rack designs have been made to reduce or eliminate wind noise with poor results.

Accordingly, there exists a need for a roof rack which is utilized for stowing luggage during travel, while at the same time providing a reduction in wind noise when not in use.

SUMMARY OF THE INVENTION

The present invention is a roof rack having stowable, non-adjustable cross-bars. The roof rack also includes a plurality of mounts attached to a vehicle in an arrangement to provide a singular stowed position and a singular deployed position for each cross-bar used. The present invention also includes at least one cross-bar attached between the stowed position or the deployed position. The cross-bar is completely detached from the plurality of mounts to move the cross-bar from the stowed position to the deployed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A is a side view of a vehicle including a roof rack having stowable non-adjustable cross-bars, according to the present invention; and FIG. 2 is an exploded view of a roof rack having stowable non-adjustable cross-bars, according to the present invention.

DETAILED DESCRIPTION OF THE PREFERRED EMBODIMENTS

Figure 1:
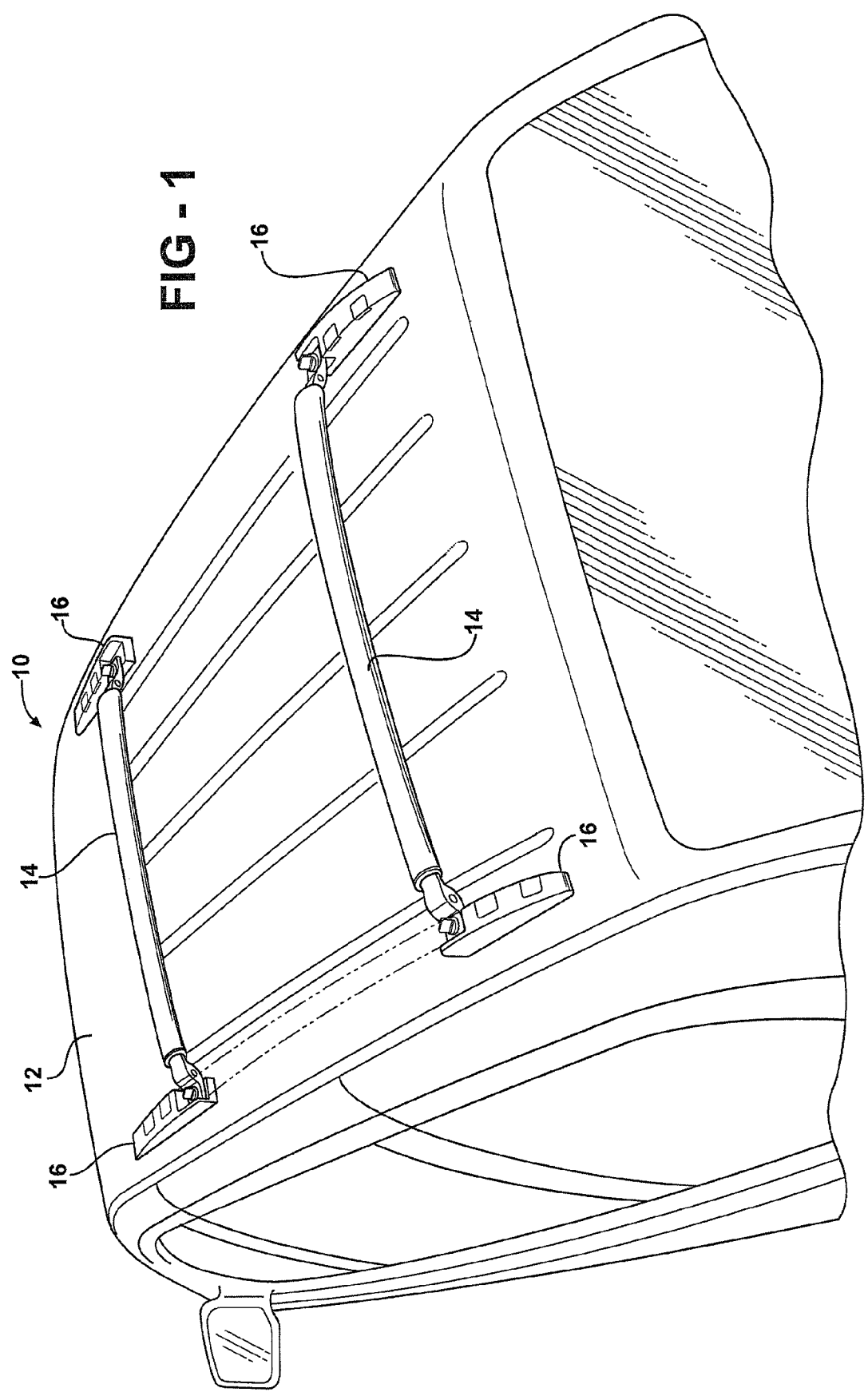
FIG. 1 is a perspective view of a vehicle including a roof rack having stowable non-adjustable cross-bars, according to the present invention.

The following description of the preferred embodiment(s) is merely exemplary in nature and is in no way intended to limit the invention, its application, or uses.

Referring to the Figures, a roof rack having stowable non-adjustable cross-bars is shown generally at 10. The roof rack 10 is mounted on a vehicle 12 and is used for stowing various items during travel. The roof rack 10 includes at least one cross-member, and in this embodiment includes two cross-bars 14, which are selectively attached to a plurality of mounts 16. The mounts 16 are permanently affixed to the vehicle 12.

The cross-bars 14 may be arranged relative to the vehicle 12 in a number of different ways. The cross-bars 14 may be connected in a deployed, or cross-car position, as shown in FIG. 1, or they may be connected in a stowed, or fore/aft position, as shown in FIG. 1A. If the cross-bars 14 are to be arranged in the fore/aft position, then the cross-bars 14 will be connected to the mounts 16 in the manner that is also shown in FIG. 2. There are four mounts 16 affixed to the vehicle 12, and are all similar in construction. The cross-bars 14 each include a hollow portion 18, and a stanchion 20. The stanchion 20 includes first portion or ribbed portion 22 which is received into the hollow portion 18, and second portion or flanged portion 24. The flanged portion 24 includes a first aperture 26 and a second aperture 28. The flanged portion 24 also includes an outer side wall 23, an inner side wall 25, and a front side wall 27. Also included is a thumb screw 30 and a washer 32, the thumb screw 30 extends through the washer 32 and the first aperture 26, as well as a push nut 34, and into a corresponding threaded aperture 36.

The threaded aperture 36 is part of a frame portion 38 of the mount 16. The frame portion 38 is surrounded by a body portion 40. The body portion has an attachment opening, generally shown at 39, which exposes the threaded aperture 36 as shown in FIG. 2. Adjacent the attachment opening 39 is an external side wall, shown generally at 41, and a lateral side wall, shown generally at 43, which are operable with the outer side wall 23, the inner side wall 25, and the front side wall 27, the function of which will be described later. These walls 41,43 form an L-shape which includes both lateral and longitudinal openings which allow positioning of the cross-bars 14 as set forth below.

The body portion 40 also includes a set of openings, which in this embodiment is a first opening 42 and a second opening 44. It can be seen through each of the openings 42,44 that there are a set of threaded fasteners 46. A retaining nut (not shown) is placed onto each of the threaded fasteners 46 to secure the frame portion 38 to the vehicle 12.

Also included are a pair of covers 48,50 which are used to cover the openings 42,44. The shape and contour of the covers 48 matches the shape and contour of the body portion 40 which surrounds the openings 42,44, such that when the covers 48,50 are received into the openings 42,44, the body portion 40 will substantially appear to not have the openings 42,44, and have a uniform contoured surface. The covers 48,50 also include a set of snap-fit attachments 52. The snap-fit attachments 52 are used for holding the covers 48,50 in the openings 42,44.

As mentioned above, the cross-bars 14 may be positioned in a cross-car position, or a fore/aft position. When in the fore/aft position, the cross-bars 14 will be connected to the frame portion 38 of the mount 16 in a manner similar to what is shown in FIGS. 1A and 2. The ribbed portion 22 is received into the hollow portion 18 of the cross-bar 14. The thumb screw 30 is then inserted through the washer 32, the first aperture 26, and the push nut 34, and is then received into the threaded aperture 36. This secures the cross-bars 14 to the mounts 16, and therefore the vehicle 12. When the cross-bars 14 are secured in the fore/aft position, the outer side wall 23 of the flanged portion 24 is positioned adjacent the external side wall 41, and the front side wall 27 of the flanged portion 24 is positioned adjacent the lateral side wall 43; this will help to prevent the cross-bars 14 from pivoting relative to the mounts 16. Both cross-bars 14 are secured to the vehicle 12 in the same manner. This is a stowed position for the cross-bars 14, and serves to reduce wind noise for when the cross-bars 14 are not in use.

The cross-bars 14 may also be placed in the cross-car position shown in FIG. 1 when it is desired to use the cross-bars 14 for stowing various items, such as luggage, on the roof of the vehicle 12. To place the cross-bars 14 in the cross-car position as shown in FIG. 1, (if the cross-bars 14 are in the fore/aft position) the thumb screws 30 are removed from the threaded apertures 36 such that the cross-bars 14 may be detached from the frame portion 38.

When the cross-bars 14 are to be placed into the cross-car position from the fore/aft position, the stanchion portions 20 of the cross-bars 14 are completely disconnected from the mounts 16 and are configured to be reattached to be in the cross-car position. There is a stanchion portion 20 at each end of the cross-bar 14, and both stanchion portions 20 are disconnected from the mounts 16 by loosening the thumb screw 30. Both cross-bars 14 are detached from the fore/aft position and reattached to the mounts 16 in the cross-car position. When in the cross-car position, the cross-bars 14 will extend across the vehicle 12 as shown in FIG. 1. Also, the front side wall 27 of the flanged portion 24 will be adjacent the external side wall 41, and the inner side wall 25 of the flanged portion 24 will be adjacent the lateral side wall 43; this will also help to prevent the cross-bars 14 from pivoting relative to the mounts 16. After the cross-bars 14 have been used, they may be returned to the stowed position, shown in FIGS. 1A and 2.

It should be noted that the cross-bars 14 are non-adjustable, meaning that they are of a single length. Therefore, the distance between the threaded aperture 36 of one mount 16 and the threaded aperture 36 of a corresponding mount 16 (i.e., the distance between the mounts 16 when the cross-bars 14 are in the cross-car position) must be the same distance compared to the distance between the mounts 16 when the cross-bars 14 are in the fore/aft position. Additionally, because of the side walls 41,43 of each of the mounts 16 and side walls 23,25,27 of the stanchions 20, the cross-bars 14 must be completely detached from the mounts 16 before the position of the cross-bars 14 may be changed from the cross-car position to the fore/aft position, and vice versa. The position of the cross-bars 14 may not be changed simply by detaching one end of a cross-bar 14 from a mounts 16 and pivoting the other end of the cross-bar 14. There is also only one place to attached the cross-bars 14 to the mounts 16, which is by using the threaded aperture 36.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A roof rack having stowable non-adjustable cross-bars, comprising:
   a plurality of mounts attached to a vehicle in an arrangement to provide a singular stowed position and a singular deployed position;
   an attachment opening formed in each of said plurality of mounts;
   a plurality of detachable cross-bars which are connectable to said plurality of mounts between said singular stowed position and said singular deployed position, wherein said plurality of detachable cross-bars must be completely detached from said plurality of mounts to move said plurality of detachable cross-bars between said singular stowed position and said singular deployed position, said plurality of detachable cross-bars further comprising a stanchion portion attached at each end of said plurality of detachable cross bar cross-bars;
   an external side wall formed as part of each of said plurality of mounts located in proximity to said attachment opening; and
   a lateral side wall formed as part of each of said plurality of mounts located in proximity to said attachment opening and perpendicular to said external side wall to form an L-shape such that said stanchion portion will be directly adjacent to said external side wall and said lateral side wall when said plurality of detachable cross-bars are in said stowed position and in said deployed position;
   wherein there is one location to attach said plurality of detachable cross-bars in said attachment opening of said plurality of mounts when in said singular stowed position and said singular deployed position;
   wherein each of said plurality of mounts further comprises:
      a frame portion;
      a body portion substantially surrounding said frame portion; and
      an aperture formed as part of said frame portion, said aperture being exposed in said attachment opening such that at least one fastener extends through at least one aperture formed as part of said stanchion portion and into said aperture to provide the attachment point for said plurality of detachable cross-bars in both said singular stowed position and said singular deployed position.

2. The roof rack having stowable non-adjustable cross-bars of claim 1, said plurality of detachable cross bar cross-bars further comprising:
   a hollow portion; and
   said stanchion portion attached to said hollow portion at each end of said plurality of detachable cross-bars.

3. The roof rack having stowable non-adjustable cross-bars of claim 2, said stanchion portion further comprising:
   a ribbed portion at least partially inserted into said hollow portion; and
   a flanged portion in connection with said ribbed portion, said at least one aperture formed as part of said flanged portion.

4. The roof rack having stowable non-adjustable cross-bars of claim 3, said flanged portion further comprising:
   an outer side wall;
   an inner side wall substantially parallel to said outer side wall;
   a front side wall substantially perpendicular to said outer side wall and said inner side wall, wherein said outer side wall and said front side wall are adjacent one of said plurality of mounts when said plurality of detachable cross-bars are in said stowed position, and said inner side wall and said front side wall are adjacent one of said plurality of mounts when said plurality of detachable cross-bars are in said deployed position.

5. The roof rack having stowable non-adjustable cross-bars of claim 2, said body portion further comprising:

a first opening formed as part of said body portion;
a second opening formed as part of said body portion such that a threaded fastener is exposed in each of said first opening and said second opening, and a portion of said frame portion is exposed in each of said first opening and said second opening to secure each of said plurality of frame mounts to said vehicle; and
a plurality of covers, one of said plurality of covers operable for being received into said first opening, and one of said plurality of covers operable for being received into said second opening, each of said plurality of covers shaped so as to match the contour of said body portion.

6. The roof rack having stowable non-adjustable cross-bars of claim 1, said stowed position further comprising a fore/aft position for reducing wind noise when said plurality of cross-bars are not in use.

7. The roof rack having stowable non-adjustable cross-bars of claim 1, said deployed position further comprising a cross-car position.

8. A roof rack having stowable, non-adjustable cross-bars, consisting essentially of:
a plurality of detachable cross-bars;
a plurality of mounts attached to a vehicle, said plurality of detachable cross-bars being operable to attach to said plurality of mounts in either a single stowed position or a single deployed position, and said plurality of cross-bars are completely detached from said plurality of mounts when changed from said single deployed position to said single stowed position, or from said single stowed position to said single deployed position;
an attachment opening formed in each of said plurality of mounts;
a stanchion portion operably connected to each end of each of said plurality of detachable cross-bars operable for connecting said plurality of cross-bars to said plurality of mounts;
a plurality of fasteners operable with said stanchion formed on each end of each of said plurality of detachable cross-bars to connect said plurality of cross-bars to said plurality of mounts;
an external side wall formed as part of each of said plurality of mounts located in proximity to said attachment opening; and
a lateral side wall formed as part of each of said plurality of mounts located in proximity to said attachment opening and perpendicular to said external side wall to form an L-shape such that said stanchion portion will be directly adjacent to said external side wall and said lateral side wall when said plurality of detachable cross bar cross-bars are in said stowed position and in said deployed position;
wherein there is one location to attach said plurality of detachable cross-bars in said attachment opening of said plurality of mounts when in said singular stowed position and said singular deployed position;
wherein each of said plurality of mounts further comprises:
a frame portion;
a body portion substantially surrounding said frame portion;
said attachment opening formed as part of said body portion such that part of said frame portion is exposed in said attachment opening;
a aperture formed as part of said frame portion, one of said plurality of fasteners being operable for being received into said aperture so as to secure said stanchion portion to said frame portion;
a first opening formed as part of said body portion, part of said frame portion being exposed in said first opening and being operable for receiving a threaded fastener to secure said frame portion to said vehicle;
a second opening formed as part of said body portion, part of said frame portion being exposed in said second opening and being operable for receiving a threaded fastener to secure said frame portion to said vehicle; and
a plurality of covers, one of said plurality of covers being operable for being received into said first opening, and one of said plurality of covers being operable for being received into said second opening for substantially matching the shape of said body portion and covering said first opening and said second opening.

9. The roof rack having stowable non-adjustable cross-bars of claim 8, each of said plurality of detachable cross-bars further comprising:
a hollow portion;
a ribbed portion formed as part of said stanchion portion, said ribbed portion operable for being received into said hollow portion to connect said stanchion portion to said hollow portion;
a flanged portion formed in connection with said stanchion portion and connected to said hollow portion; and
at least one aperture formed in said flanged portion, one of said plurality of fasteners being operable for extending through said at least one aperture for selectively connecting said stanchion portion to one of said plurality of mounts.

10. The roof rack having stowable non-adjustable cross-bars of claim 9, further comprising:
an outer side wall formed as part of said flanged portion;
an inner side wall formed as part of said flanged portion, said inner side wall substantially parallel to said outer side wall; and
a front side wall formed as part of said flanged portion, said front side wall being substantially perpendicular to said outer side wall and said inner side wall;
wherein when each of said plurality of detachable cross-bars are in said stowed position, said front side wall will be adjacent to said lateral side wall and said outer side wall will be adjacent said external side wall, and when each of said plurality of detachable cross-bars are in said deployed position, said front side wall be adjacent said external side wall and said inner side wall will be adjacent to said lateral side wall.

11. The roof rack having stowable non-adjustable cross-bars of claim 8, said stowed position further comprising a fore/aft position, wherein each of said plurality of non-adjustable cross-bars are placed in said fore/aft position when said plurality of cross-bars are not in use, thereby reducing the amount of wind noise when said plurality of cross-bars are not in use.

12. The roof rack having stowable non-adjustable cross-bars of claim 8, said deployed position further comprising a cross-car position.

13. A roof rack having stowable non-adjustable cross-bars, comprising:
a plurality of mounts attached to a vehicle;
an attachment opening formed on each of said plurality of mounts, said attachment opening forming a lateral and longitudinal opening;
a plurality of detachable cross-bars, each one of said plurality of detachable cross-bars being operable for selective attachment to at least two of said plurality of mounts using said attachment opening in a single fore/aft position or a single cross-car position, said plurality of detachable cross-bars being completely detached from said plurality of mounts when changed from said single cross-car position to said single fore/aft position, or from said single fore/aft position to said single cross-car position;

a plurality of stanchions, one of said plurality of stanchions connected to each end of each of said plurality of detachable cross-bars operable for connecting said plurality of cross-bars to said plurality of mounts in either of said fore/aft position or said cross-car position; and a plurality of fasteners operable for attaching each of said plurality of stanchions to said plurality of mounts in said attachment opening formed on each of said plurality of mounts;

an external side wall formed as part of each of said plurality of mounts located in proximity to said attachment opening; and a lateral side wall formed as part of each of said plurality of mounts located in proximity to said attachment opening and substantially perpendicular to said external side wall to form an L-shape such that said stanchion portion will be directly adjacent to said external side wall and said lateral side wall when said plurality of detachable cross-bars are in said fore/aft position and in said cross-car position to prevent said plurality of detachable cross-bars from pivoting relative to said plurality of mounts;

wherein there is one location to attach said plurality of detachable cross-bars in said attachment opening of said plurality of mounts when in said fore/aft position and said cross-car position;

wherein each of said plurality of mounts further comprises:
  a frame portion operable for providing a connection with said vehicle;
  a body portion substantially surrounding said frame portion, said attachment opening being formed as part of said body portion; and
  an aperture formed as part of said frame portion and exposed in said attachment opening, one of said plurality of fasteners being operable for being received into said aperture so as to secure said stanchion portion to said frame portion.

14. The roof rack having stowable non-adjustable cross-bars of claim 13, further comprising:
  a flanged portion formed as part of each of said plurality of stanchions, said flanged portion being operable for connection with one of said plurality of mounts in said attachment opening;
  at least one aperture formed as part of said flanged portion, one of said plurality of fasteners being operable for extending through said at least one aperture formed as part of said flanged portion and said aperture to connect said flanged portion to one of said plurality of mounts;
  a ribbed portion formed as part of each of said plurality of stanchions, said ribbed portion operably connected to said flanged portion; and
  a hollow portion formed as part of each of said plurality of cross-bars, said hollow portion being operable to receive said ribbed portion, thereby connecting said stanchion to said cross-bar.

15. The roof rack having stowable non-adjustable cross-bars of claim 14, further comprising:
  an outer side wall formed as part of said flanged portion;
  an inner side wall formed as part of said flanged portion, said inner side wall substantially parallel to said outer side wall and said inner side wall;
  a front side wall formed as part of said flanged portion, said front side wall substantially perpendicular to said outer side wall;
  wherein when each of said plurality of detachable cross-bars are in said stowed position, said front side wall will be adjacent to said lateral side wall and said outer side wall will be adjacent said external side wall, and when each of said plurality of detachable cross-bars are in said deployed position, said front side wall be adjacent said external side wall and said inner side wall will be adjacent to said lateral side wall.

16. The roof rack having stowable non-adjustable cross-bars of claim 13, further comprising:
  a first opening formed as part of said body portion, part of said frame portion being exposed in said first opening and being operable for receiving a threaded fastener to secure said frame portion to said vehicle;
  a second opening formed as part of said body portion, part of said frame portion being exposed in said second opening and being operable for receiving a threaded fastener to secure said frame portion to said vehicle; and
  a plurality of covers, one of said plurality of covers being operable for being received into said first opening, and one of said plurality of covers being operable for being received into said second opening for substantially matching the shape of said body portion and covering said first opening and said second opening.

* * * * *